US010138309B2

(12) United States Patent
Nagano et al.

(10) Patent No.: US 10,138,309 B2
(45) Date of Patent: Nov. 27, 2018

(54) METHOD FOR PRODUCING PARTICULATE POLYMER

(71) Applicants: Kaneka Corporation, Osaka (JP); National University Corporation Kobe University, Hyogo (JP)

(72) Inventors: Takuto Nagano, Osaka (JP); Katsumi Yamaguchi, Hyogo (JP); Hideto Minami, Hyogo (JP)

(73) Assignees: KANEKA CORPORATION, Osaka (JP); National University Corporation Kobe University, Hyogo (JP)

( * ) Notice: Subject to any disclaimer, the term of this patent is extended or adjusted under 35 U.S.C. 154(b) by 0 days.

(21) Appl. No.: 15/666,006

(22) Filed: Aug. 1, 2017

(65) Prior Publication Data

US 2017/0335029 A1 Nov. 23, 2017

Related U.S. Application Data

(63) Continuation of application No. PCT/JP2016/053832, filed on Feb. 9, 2016.

(30) Foreign Application Priority Data

Feb. 13, 2015 (JP) .................................. 2015-026306

(51) Int. Cl.
| | | |
|---|---|---|
| *C08F 112/08* | (2006.01) | |
| *C08F 2/26* | (2006.01) | |
| *C08F 6/22* | (2006.01) | |

(52) U.S. Cl.
CPC .............. *C08F 112/08* (2013.01); *C08F 2/26* (2013.01); *C08F 6/22* (2013.01)

(58) Field of Classification Search
CPC .. C08F 2/26; C08F 6/22; C08F 112/08; C08F 25/06
USPC .................................................. 526/199, 348
See application file for complete search history.

(56) References Cited

U.S. PATENT DOCUMENTS

2016/0024275 A1 1/2016 Noda et al.

FOREIGN PATENT DOCUMENTS

| JP | 2003-128512 | * | 5/2003 |
|---|---|---|---|
| JP | 2003128512 A | | 5/2003 |
| JP | 2005015353 A | | 1/2005 |
| JP | 2005015537 A | | 1/2005 |
| JP | 2007296120 A | | 11/2007 |
| JP | 2008162975 A | | 7/2008 |
| JP | 2009155306 A | | 7/2009 |
| JP | 2010284519 A | | 12/2010 |
| WO | 2007126067 A1 | | 11/2007 |
| WO | 2010125691 A1 | | 11/2010 |
| WO | 2014142177 A1 | | 9/2014 |

OTHER PUBLICATIONS

International Search Report issued in International Application No. PCT/JP2016/053832; dated Mar. 22, 2016 (2 pages).

* cited by examiner

*Primary Examiner* — William K Cheung
(74) *Attorney, Agent, or Firm* — Osha Liang LLP

(57) ABSTRACT

A method for producing a particulate polymer includes polymerizing a monomer having a vinyl group in an aqueous solvent in the presence of a surfactin salt and a polymerization initiator, wherein a concentration of the surfactin salt in a polymerization reaction liquid is adjusted depending on a target particle diameter of the particulate polymer.

9 Claims, 3 Drawing Sheets

METHOD FOR PRODUCING PARTICULATE POLYMER

This application is a continued application of Application No. PCT/JP2016/077320 filed in Japan on Feb. 9, 2016, which claims priority to and incorporates by reference the entire contents of Japanese Patent Application No. 2015-026306 filed in Japan on Feb. 15, 2015. The disclosures of Application No. PCT/JP2016/077320 and Japanese Patent Application No. 2015-026306 are entirely incorporated herein by reference.

TECHNICAL FIELD

One or more embodiments of the present invention relate to a method for producing a particulate polymer while a particle diameter of the particulate polymer can be controlled.

BACKGROUND

Various methods for polymerizing a monomer having a vinyl group have been known, and an emulsion polymerization method and a suspension polymerization method are exemplified as an important method. The methods have advantages that the heat generated by a polymerization reaction can be easily removed and a reaction temperature can be readily controlled, since an aqueous solvent is used in the methods. In addition, the methods also have advantages that a polymer as a product can be obtained as a small particle and easily separated from a solvent phase, washed and dried.

In an emulsion polymerization method, a monomer may be polymerized using a surfactant and a polymerization initiator in an aqueous solvent. A monomer having a vinyl group is generally insoluble or hardly dissolved in water but is dispersed in an aqueous solvent by being incorporated in a micelle composed of a surfactant. In such a micelle, a monomer is polymerized by a radical generated from a polymerization initiator. The general size of the micelle is about several nanometers, and the polymer obtained by an emulsion polymerization method has excellent properties that the polymer is very fine as the size thereof is several dozen nanometers to several hundred nanometers but the polymerization degree thereof is large.

In addition, by an emulsion polymerization method, it is possible to adjust the composition, molecular weight and higher-order structure of a polymer depending on the use application thereof. Furthermore, a polymer dispersion obtained by an emulsion polymerization method is directly used as a paint, an adhesive, a medical or industrial determination agent or the like in some cases. Alternatively, a particulate polymer separated from an aqueous solvent after an emulsion polymerization is used, for example, for improving an impact resistance, toughness and melt processability, adjusting an optical property such as light diffusion, matte, interference color, coloration and wavelength cutting, and improving a blocking property of a film material by adding the particulate polymer to other material such as printing ink material, spacer and other polymer material.

On the one hand, a polymer obtained by an emulsion polymerization method may have a property intrinsic to the polymer lost due to the incorporation of a surfactant. A surfactant is also incorporated in a drainage after separating a polymer and causes environmental damage in some cases; therefore, it is required to reduce the amount of a surfactant. A prescribed amount of a surfactant is however needed for dispersing a micelle or a droplet of a monomer when a monomer which is insoluble or hardly dissolved in water is used in an emulsion polymerization.

As a biosurfactant, which is a surfactant derived from organisms, surfactin has been known. Surfactin exhibits an excellent surfactant activity, since surfactin has a cyclic peptide structure and the size of the hydrophilic cyclic structure is much larger than a conventional surfactant. Accordingly, a sodium salt thereof is used as a surfactant in cosmetics or the like (Patent Document 1).

In Patent Documents 2 to 9, a surfactin salt is exemplified as a surfactant used in an emulsion polymerization method. In addition, a method for polymerizing a vinyl-based monomer using a surfactin salt in a low concentration has been developed as Patent Document 10.

PRIOR ART DOCUMENT

Patent Document

Patent Document 1: JP 2003-128512 A
Patent Document 2: JP 2005-15353 A
Patent Document 3: JP 2005-15537 A
Patent Document 4: JP 2007-296120 A
Patent Document 5: JP 2008-162975 A
Patent Document 6: JP 2009-155306 A
Patent Document 7: JP 2010-284519 A
Patent Document 8: WO 2007/126067
Patent Document 9: WO 2010/125691
Patent Document 10: WO 2014/142177

SUMMARY

As described above, a polymerization method using a surfactin salt has been known.

A particle diameter of a particulate polymer produced by an emulsion polymerization may be controlled depending on the use application of the polymer.

One or more embodiments of the present invention provide a method for producing a particulate polymer while relatively small amount of a surfactant is used and a particle diameter of the particulate polymer can be controlled.

The inventors of the present invention have found that though it is known as Smith-Ewart theory that the particle number of a particulate polymer produced by an emulsion polymerization is associated with the particle diameter of the polymer and the particle number is proportionate to three-fifths power of a concentration of a surfactant, when a surfactin salt is used as an emulsifier, the relation of a particle diameter and a surfactant concentration is not based on the theory and a particle diameter can be controlled in accordance with a unique formula.

Hereinafter, one or more embodiments of the present invention is described.

[1] A method for producing a particulate polymer, comprising the step of polymerizing a monomer having a vinyl group in an aqueous solvent in the presence of a polymerization initiator and a surfactin salt represented by the following formula (1):

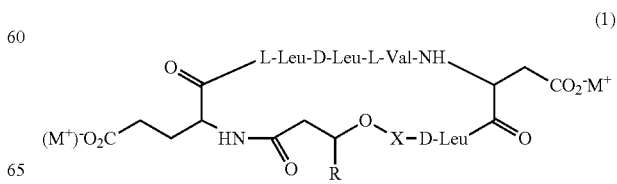

wherein 'X' is an amino acid residue selected from leucine, isoleucine and valine; 'R' is a $C_{9-18}$ alkyl group; 'Mt' is an alkali metal ion or a quaternary ammonium ion;

wherein a concentration of the surfactin salt (1) in a polymerization reaction liquid is adjusted in accordance with the following formulae (a) to (c) depending on a target particle diameter of the particulate polymer:

$$\log(y^1 k) = -0.11 \log(x^1) + 1.91 \qquad \text{formula (a):}$$

$$\log(y^2 k) = -0.54 \log(x^2) - 0.0096 \qquad \text{formula (b):}$$

$$\log(y^3 k) = -0.069 \log(x^3) + 1.55 \qquad \text{formula (c):}$$

wherein $y^1$ to $y^3$ are the target particle diameters of the particulate polymer in a unit of nm; $y^1$ is 250 nm or more and 400 nm or less; $y^2$ is 55 nm or more and less than 250 nm; $y^3$ is 30 nm or more and less than 55 nm; $x^1$ to $x^3$ are the concentrations of the surfactin salt (1) in the polymerization reaction liquid in a unit of mM; k is a constant of 0.5 or more and 2 or less.

[2] The method according to the above [1], wherein the concentration of the surfactin salt (1) in the polymerization reaction liquid is adjusted to 0.0005 mass % or less.

[3] The method according to the above [1], wherein a ratio of the surfactin salt (1) to 100 parts by mass of the monomer is adjusted to 20 parts by mass or less.

[4] The method according to any one of the above [1] to [3], further comprising the steps of:
separating the produced particulate polymer from a liquid phase;
adding a multivalent metal ion to the liquid phase in order to coagulate the surfactin salt; and
separating the coagulated surfactin salt.

[5] The method according to the above [4], further comprising the step of adding an alkali metal ion to the polymerization reaction liquid after the step of polymerization and before the step of separating the particulate polymer in order to coagulate the particulate polymer.

According to one or more embodiments of the present invention, a vinyl-based monomer can be polymerized by an emulsion polymerization or a suspension polymerization by using a relatively small amount of a surfactant. As a result, a high quality particulate polymer in which an amount of a residual surfactant is remarkably reduced can be produced, and it may not be needed to treat a drainage or time and effort for the treatment can be reduced, since an amount of a residual surfactant in a drainage can be also remarkably reduced. In addition, the particle diameter of the particulate polymer to be produced can be controlled. Furthermore, since the surfactin salt used as a surfactant may be a peptide compound, even when the surfactin salt is released into the environment, the salt is promptly decomposed by a bacterium or the like and has the least adverse effect on the environment. Thus, one or more embodiments of the present invention may take the place of a conventional method for producing a polymer and is industrially excellent.

DETAILED DESCRIPTION OF THE EMBODIMENTS

Figure 1:
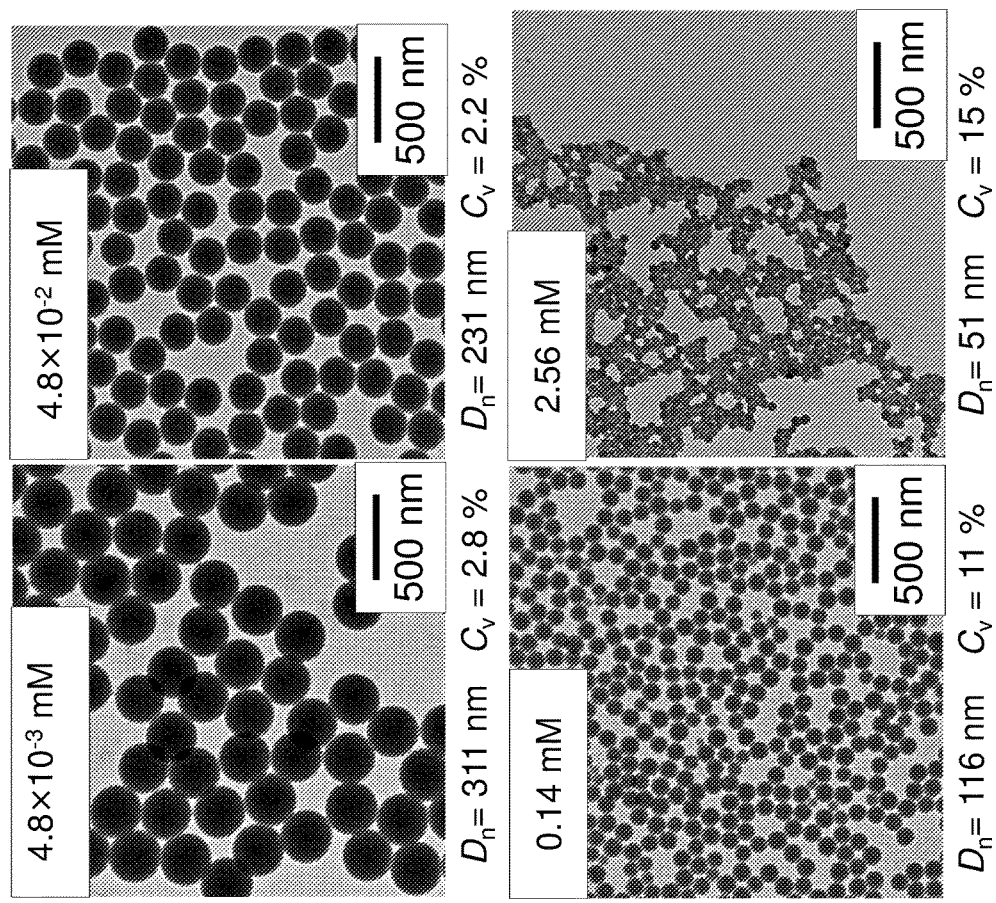
FIG. 1 is a transmission electron microscope (TEM) photograph of a particulate polymer produced according to one or more embodiments of the present invention.

The method for producing a particulate polymer according to one or more embodiments of the present invention is characterized in comprising the step of polymerizing a monomer having a vinyl group in an aqueous solvent in the presence of the surfactin salt (1) and a polymerization initiator;

wherein a concentration of the surfactin salt (1) in a polymerization reaction liquid is adjusted in accordance with the following formulae (a) to (c) depending on a target particle diameter of the particulate polymer:

$$\log(y^1 k) = -0.11 \log(x^1) + 1.91 \qquad \text{formula (a):}$$

$$\log(y^2 k) = -0.54 \log(x^2) - 0.0096 \qquad \text{formula (b):}$$

$$\log(y^3 k) = -0.069 \log(x^3) + 1.55 \qquad \text{formula (c):}$$

wherein $y^1$ to $y^3$ are the target particle diameters of the particulate polymer in a unit of nm; $y^1$ is 250 nm or more and 400 nm or less; $y^2$ is 55 nm or more and less than 250 nm; $y^3$ is 30 nm or more and less than 55 nm; $x^1$ to $x^3$ are the concentrations of the surfactin salt (1) in the polymerization reaction liquid in a unit of mM; k is a constant of 0.5 or more and 2 or less.

Hereinafter, one or more embodiments of the present invention is described in the implementation order.

(1) Polymerization Step

In one or more embodiments of the present invention, the surfactin salt represented by the following formula (1):

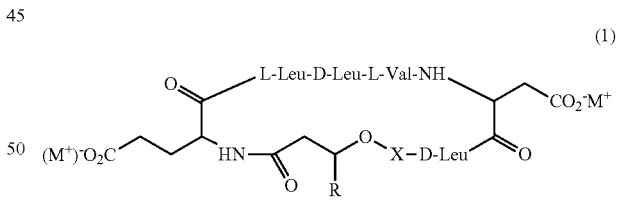

wherein 'X' is an amino acid residue selected from leucine, isoleucine and valine; 'R' is a $C_{9-18}$ alkyl group; 'Mt' is an alkali metal ion or a quaternary ammonium ion;

is used as a surfactant. Even when the surfactin salt is used in a smaller amount than that for a conventional polymerization condition, the surfactin salt can constitute a micelle in an emulsion polymerization and can stabilize a droplet in a suspension polymerization.

The amino acid residue as 'X' may be either in a L-form or a D-form.

The term "$C_{9-18}$ alkyl group" means a linear or branched monovalent saturated hydrocarbon group having not less than 9 and not more than 18 carbon atoms. The example thereof includes n-nonyl, 6-methyloctyl, 7-methyloctyl, n-decyl, 8-methylnonyl, n-undecyl, 9-methyldecyl, n-dodecyl, 10-methylundecyl, n-tridecyl, 11-methyldodecyl, n-tetradecyl, n-pentadecyl, n-hexadecyl, n-heptadecyl and n-octadecyl.

The alkali metal ion is not particularly restricted and represents a lithium ion, a sodium ion, a potassium ion or the like.

The example of a substituent of the quaternary ammonium ion includes an organic group exemplified by a $C_{1-4}$ alkyl group such as methyl, ethyl, n-propyl, isopropyl, n-butyl and tert-butyl; a $C_{6-12}$ aryl-$C_{1-4}$ alkyl group such as benzyl, methylbenzyl and phenylethyl; and a $C_{6-12}$ aryl group such as phenyl, toluyl and xylyl. The quaternary ammonium ion is exemplified by a tetramethylammonium ion, a tetraethylammonium ion and a pyridinium ion.

Either one of the surfactin salts or two or more salts may be used.

The surfactin salt can be isolated from a culture medium prepared by cultivating a microorganism such as a strain belonging to *Bacillus subtilis* in accordance with a known method. The surfactin salt may be a purified product or an unpurified product. Such an unpurified product is exemplified by a culture medium as it is. The product of the surfactin salt obtained by a chemical synthesis method may be similarly used.

In one or more embodiments of the present invention, the target particle diameter of the particulate polymer to be produced is preliminarily determined, and the concentration of the surfactin salt (1) in the polymerization reaction liquid is adjusted depending on the determined target particle diameter. For example, the particle diameter of the particulate polymer produced is 3 nm or more and 2000 nm or less.

After the target particle diameter of the particulate polymer to be produced is determined, the particle diameter value is assigned to one of $y^1$ to $y^3$ in the formulae (a) to (c) depending on the target particle diameter and one of $x^1$ to $x^3$ in a unit of mM is calculated as a concentration of the surfactin salt (1) in the polymerization reaction liquid.

In general, a particle diameter of a polymer obtained by a suspension polymerization and an emulsion polymerization is varied depending on the kind and the amount of a monomer and a polymerization initiator; therefore, ranges are provided to the values of $x^1$ to $x^3$, which corresponds to a calculated concentration of the surfactin salt (1), by constant k. The constant k is set at 0.5 or more and 2 or less, of which lower limit and upper limit are respectively third roots of ⅛ and 8, on the grounds that a concentration of a solid component in the polymerization reaction liquid may be changed to from ⅛ through 8 times. The value of constant k may be 0.6 or more, 0.8 or more, or 0.9 or more, and 1.5 or less, 1.2 or less, or 1.1 or less.

In one or more embodiments of the present invention, the concentration of the surfactin salt (1) in the polymerization reaction liquid is determined as the value calculated by using one of formulae (a) to (c) as the above, and an amount of the surfactin salt (1) to be used is calculated depending on a production scale.

The concentration of the surfactin salt (1) in the polymerization reaction liquid may be adjusted to 1 mass % or less and/or the ratio of the surfactin salt (1) to 100 parts by mass of the monomer may be adjusted to 20 parts by mass or less. Accordingly, when the surfactin salt (1) is used, the relationship between the number of the generated particulate polymer and the concentration of the surfactin salt (1) is not based on Smith-Ewart theory, and an emulsion polymerization and a suspension polymerization are possible even when a smaller amount of the surfactin salt (1) is used than that of the case of using other surfactant. It is presumed that when the concentration of the surfactin salt (1) in the polymerization reaction liquid is relatively low, the polymerization reaction proceeds by a mechanism similar to that of an emulsion polymerization without an emulsifier. Since a droplet however tends to be stable when an amount of a surfactant is larger, the above concentration may be 0.00001 mass % or more and the above ratio may be 0.001 parts by mass or more. The above concentration may be 0.00005 mass % or more, 0.0001 mass % or more, or 0.0002 mass % or more, and may be 0.1 mass % or less, 0.01 mass % or less, 0.001 mass % or less, or 0.0005 mass % or less. The above ratio may be 0.005 parts by mass or more, or 0.01 parts by mass or more, and may be 15 parts by mass or less, 10 parts by mass or less, 1 part by mass or less, 0.1 parts by mass or less, or 0.01 parts by mass or less.

The polymerization initiator may be appropriately selected, and is exemplified by an organic peroxide, an inorganic peroxide and an azo compound such as 2,2'-azobis (isobutyronitrile). An organic peroxide is exemplified by a peroxide of a ketone or an aldehyde, such as cyclohexanone peroxide; a diacyl peroxide such as acetyl peroxide; a hydroperoxide such as t-butyl hydroperoxide and cumene hydroperoxide; a dialkyl peroxide such as di-t-butyl peroxide; an alkyl perester such as t-butyl peroxyisobutyrate; a percarbonate such as t-butyl peroxy isopropylcarbonate. An inorganic peroxide is exemplified by hydrogen peroxide and potassium persulfate. The polymerization initiator is not restricted to the above examples. When an organic peroxide and/or an inorganic peroxide is used in the above examples, the peroxide may be used as a heat decomposable polymerization initiator or a redox type polymerization initiator with using a reducing agent such as ascorbic acid sodium salt and sodium formaldehydesulfoxylate, a promoter such as ferrous sulfate, and a chelator such as ethylenediaminetetraacetic acid if needed. A water-soluble polymerization initiator is used in the case of an emulsion polymerization, and an oil-soluble polymerization initiator is used in the case of a suspension polymerization.

A usage of the polymerization initiator may be appropriately adjusted, and for example, is adjusted to 0.1 parts by mass or more and 5 parts by mass or less to 100 parts by mass of the monomer.

A reducing agent usable with the polymerization initiator may be used. Such a reducing agent is exemplified by sodium hydrogen sulfite, sodium formaldehyde sulfoxylate and sodium metabisulfite.

A usage of the reducing agent may be appropriately adjusted and for example, is adjusted to 0.1 parts by mass or more and 5 parts by mass or less to 100 parts by mass of the monomer.

The aqueous solvent usable in one or more embodiments of the present invention is a solvent which contains water as a main component. The kind of the usable water is not particularly restricted and can be appropriately selected from distilled water, pure water, ultrapure water, purified water, tap water, well water and the like.

The monomer polymerizable in one or more embodiments of the present invention is exemplified by a vinyl-based monomer having a vinyl group which can be polymerized by a radical polymerization. Such a monomer is exemplified by a vinyl ester monomer such as vinyl acetate and vinyl propionate; an aromatic vinyl compound monomer such as styrene, vinyl toluene, α-methylstyrene, chlorostyrene, bromostyrene, a p-styrenesulfonic acid derivative, divinylbenzene and divinyltoluene; an olefin monomer such as ethylene, propylene, methylpentene, 1-butene and a norbornene derivative; a diene monomer such as isoprene and butadiene; a (meth)acrylate monomer such as (meth)acrylic acid, methyl (meth)acrylate, ethyl (meth)acrylate, butyl (meth)acrylate, 2-ethylhexyl (meth)acrylate, stearyl (meth)acrylate, 2-hydroxyethyl (meth)acrylate, phenoxyethyl (meth)acrylate, ethylene glycol di(meth)acrylate, amide (meth)acrylate or a N-substituted derivative, diacetone acrylamide, poly(oxyalkylene glycol) mono- or di-(meth)acrylate, glycerin mono-, di- or tri-(meth)acrylate and bisphenol A di(meth)acrylate; a halogenated vinyl monomer such as vinyl chloride, vinylidene chloride and vinylidene fluoride; a maleimide monomer such as N-phenylmaleimide, N-cyclohexylmaleimide and N-methylmaleimide, but is not restricted to the above examples. Only one monomer may be used, or two or more monomers may be used in combination for copolymerization.

A usage of the monomer is not particularly restricted and may be appropriately adjusted, and can be adjusted to 0.5 parts by mass or more and 200 parts by mass or less such as 1 part by mass or more and 100 parts by mass or less to 100 parts by mass of the aqueous solvent.

A conventional method may be used as a reference in order to determine a specific condition for the polymerization reaction. For example, in the case of an emulsion polymerization, a pre-emulsion is prepared by mixing a part of the aqueous solvent, a part of the water-soluble polymerization initiator, a part of the surfactin salt (1) and the monomer, a solution is prepared by mixing the remaining aqueous solvent, polymerization initiator and the surfactin salt (1), the pre-emulsion is added dropwise to the stirred solution. In the case of a suspension polymerization, for example, a mixture containing at least the surfactin salt (1), the lipophilic polymerization initiator, the monomer and the aqueous solvent is stirred for the reaction with stabilizing droplet.

A gas phase in a reaction vessel may be substituted by an inert gas such as nitrogen gas and argon gas for stabilizing a radical required for the polymerization reaction. Dissolved oxygen may also be removed from the aqueous solvent by a treatment such as an infusion of an inert gas for the similar reason.

A reaction temperature and reaction time are not particularly restricted and may be appropriately adjusted. For example, the reaction temperature may be adjusted to about 40° C. or higher and about 120° C. or lower and the reaction time may be adjusted to about 10 minutes or more and about 20 hours or less.

(2) Step for Coagulating Particulate Polymer

A dispersion of the particulate polymer particle obtained in the above-described polymerization step, particularly the reaction liquid obtained by emulsion polymerization, can be directly used as an adhesive, a paint or the like. In one or more embodiments of the present invention, the surfactin salt is used as a surfactant in a smaller usage than that of a conventional surfactant. As a result, an amount of the surfactant which is incorporated in the obtained particulate polymer dispersion, i.e. latex, is smaller and an adverse influence by the surfactant can be suppressed.

An amount of the surfactant can be further decreased by separating the particulate polymer from the liquid phase. In the present step, therefore, the particulate polymer is coagulated. The present step is however optional and may not be necessarily performed.

In one or more embodiments of the present invention, the particulate polymer may be coagulated by adding an alkali metal ion in the reaction liquid after the reaction.

A coagulating agent for the particulate polymer coagulates the particulate polymer due to hydrophobic interaction by preventing an ionization of a hydrophilic group of the surfactant to decrease a surface activating ability of the surfactant. As such a coagulating agent, aluminum potassium sulfate, triethylenetetramine, sodium hydroxide, potassium hydroxide, sodium chloride, magnesium chloride, calcium chloride, hydrochloric acid, sulfuric acid, sodium sulfate or the like is usually used, and a multivalent metal ion, sodium hydroxide and the like are also used in combination, since only an alkali metal ion may not have a sufficient coagulation ability. In particular, the inventors considered that the surface activating ability of the surfactin salt cannot be reduced and the particulate polymer cannot be coagulated by using an alkali metal ion only, since the surfactin salt such as surfactin alkali metal salt is used as a surfactant in one or more embodiments of the present invention. Contrary to the expectation, the preset inventors found that the particulate polymer can be coagulated by adding an alkali metal ion only to the reaction liquid after the reaction.

The alkali metal ion is exemplified by a sodium ion, a potassium ion and a lithium ion. A salt of the alkali metal ion is very convenient. Such a salt is exemplified by a halide salt such as a chloride and a bromide; a sulfate; a carbonate; and a hydrogencarbonate. In addition, an aqueous solution of the alkali metal ion can be easily added to the reaction liquid.

A usage of the alkali metal ion may be appropriately adjusted as long as the particulate polymer can be sufficiently coagulated. A temperature for coagulating the particulate polymer is not particularly restricted and may be appropriately adjusted, and for example, may be adjusted to 5° C. or higher and 50° C. or lower.

(3) Step for Separating Particulate Polymer

Whether or not the above-described coagulation step is performed, the particulate polymer can be separated from the liquid phase. In accordance with the present step, the particulate polymer can be separated from the liquid phase containing the surfactant, and the amount of the surfactant which is incorporated in the particulate polymer can be further reduced. Further, the mixture of the particulate polymer and the liquid phase can be directly used as described above.

As a method for separating the particulate polymer from the liquid phase, an ordinary method can be used. For example, a filtration and a centrifugation may be performed. Alternatively, the mixture obtained by the above-described coagulation step is stood still to precipitate the coagulated particulate polymer, and the liquid phase as a supernatant may be removed by decantation. In order to improve a separation efficiency, the surfaces of the particulate polymers are fused by heating the particulate polymer dispersion up to more than a softening point of the particulate polymer.

The particulate polymer separated from the liquid phase may be appropriately subjected to an aftertreatment such as washing and drying.

(4) Step for Coagulating Surfactin Salt

The liquid phase obtained by the above-described step for separating the particulate polymer contains the surfactin salt. In the present step, an amount of the surfactin salt in the liquid phase is reduced by coagulating the surfactin salt. Since the amount of the surfactant in the liquid phase can be reduced by the present step, an adverse effect on environment can be suppressed even when the liquid phase obtained by one or more embodiments of the present invention is released to the environment and drainage can be easily treated.

It is very difficult to coagulate a general surfactant as a solid from the solution thereof. On the one hand, the inventors found that the surfactin salt can be coagulated by adding a multivalent metal ion to the solution of the surfactin salt.

The multivalent metal ion means a metal ion having valences of two or more. Such a multivalent metal ion is exemplified by an alkaline-earth metal ion such as a magnesium ion and a calcium ion; and a trivalent metal ion such as an aluminum ion.

A salt of the multivalent metal ion is very convenient. Such a salt is exemplified by a halide salt such as a chloride and a bromide; a sulfate; and a carbonate. In addition, an aqueous solution of the multivalent metal ion can be easily added to the reaction liquid.

A usage of the multivalent metal ion may be appropriately adjusted as long as the surfactin salt can be sufficiently coagulated. For example, the multivalent metal ion may be added in an amount of equimolar or more to the used surfactin salt. On the one hand, the upper limit is not particularly restricted, and for example, the above ratio may be adjusted to about 20 times by mole or less.

A temperature for coagulating the surfactin salt is not particularly restricted and may be appropriately adjusted, and for example, may be adjusted to 5° C. or higher and 50° C. or lower.

(5) Step for Separating Surfactin Salt

The surfactin salt which is coagulated by the above-described step for coagulating the surfactin salt can be separated from the liquid phase. The surfactin salt as a surfactant is removed from the thus obtained liquid phase, and the contained amount thereof is remarkably reduced. Accordingly, the liquid phase obtained by the present step may be directly discharged or may be treated very easily. In addition, for example, the separated surfactin salt can be solubilized again by the treatment with a large amount of an alkali metal ion or a quaternary ammonium ion to be reused.

As a method for separating the coagulated surfactin salt from the liquid phase, the above-described method exemplified as a method for separating the particulate polymer from the liquid phase can be used.

An amount of the surfactant, i.e. the surfactin, which is incorporated in the particulate polymer produced as described above is remarkably reduced. A contained amount of the surfactant in the particulate polymer may be 0.1 mass % or less.

A surfactant which constitutes a micelle or a water-soluble polymer as a stabilizing agent for a droplet is unavoidably incorporated in a particulate polymer produced by conventional emulsion polymerization and suspension polymerization, and an inherent property of a particulate polymer is deteriorated due to such an incorporated surfactant or water-soluble polymer. For example, it has been known that when a surfactant remains in a particulate polymer produced as a general resin modifier, a property of a general resin to which the modifier is added is severely deteriorated and performance deterioration such as undesired coloration, strength decrease and deterioration in durability is observed.

On the one hand, a contained amount of a surfactant in the particulate polymer produced by one or more embodiments of the present invention is remarkably reduced. As a result, the particulate polymer is not adversely affected by a surfactant and has high quality.

The present application claims the benefit of the priority date of Japanese patent application No. 2015-26306 filed on Feb. 13, 2015. All of the contents of the Japanese patent application No. 2015-26306 filed on Feb. 13, 2015, are incorporated by reference herein.

EXAMPLES

Hereinafter, one or more embodiments of the present invention is described in more detail with Examples. The present invention is however not restricted to the following Examples in any way, and it is possible to carry out the present invention according to the Examples with an additional appropriate change within the range of the above descriptions and the following descriptions. Such a changed embodiment is also included in the technical scope of the present invention.

Examples 1 to 4

Into a 200 mL separable flask, water (110 mL) as a solvent, sodium hydrogencarbonate (0.05 g) as a pH adjuster and sodium surfactin (manufactured by KANEKA Corporation) as a surfactant were added to prepare a solution. An amount of sodium surfactin was adjusted so that the concentration thereof in a polymerization reaction liquid was $4.8 \times 10^{-3}$ to 2.56 mM. Into the solution, styrene (6 g) was added as a monomer. The temperature of the liquid was adjusted to 70° C. using a water bath, and then the gas phase was replaced by nitrogen. Into the liquid, an aqueous solution of potassium persulfate (10 mL) was added in a ratio of 1.2 mass % to the monomer. The reaction liquid was stirred at 240 rpm using an anchor type stirring blade for 2 to 8 hours for polymerization reaction.

Figure 2:
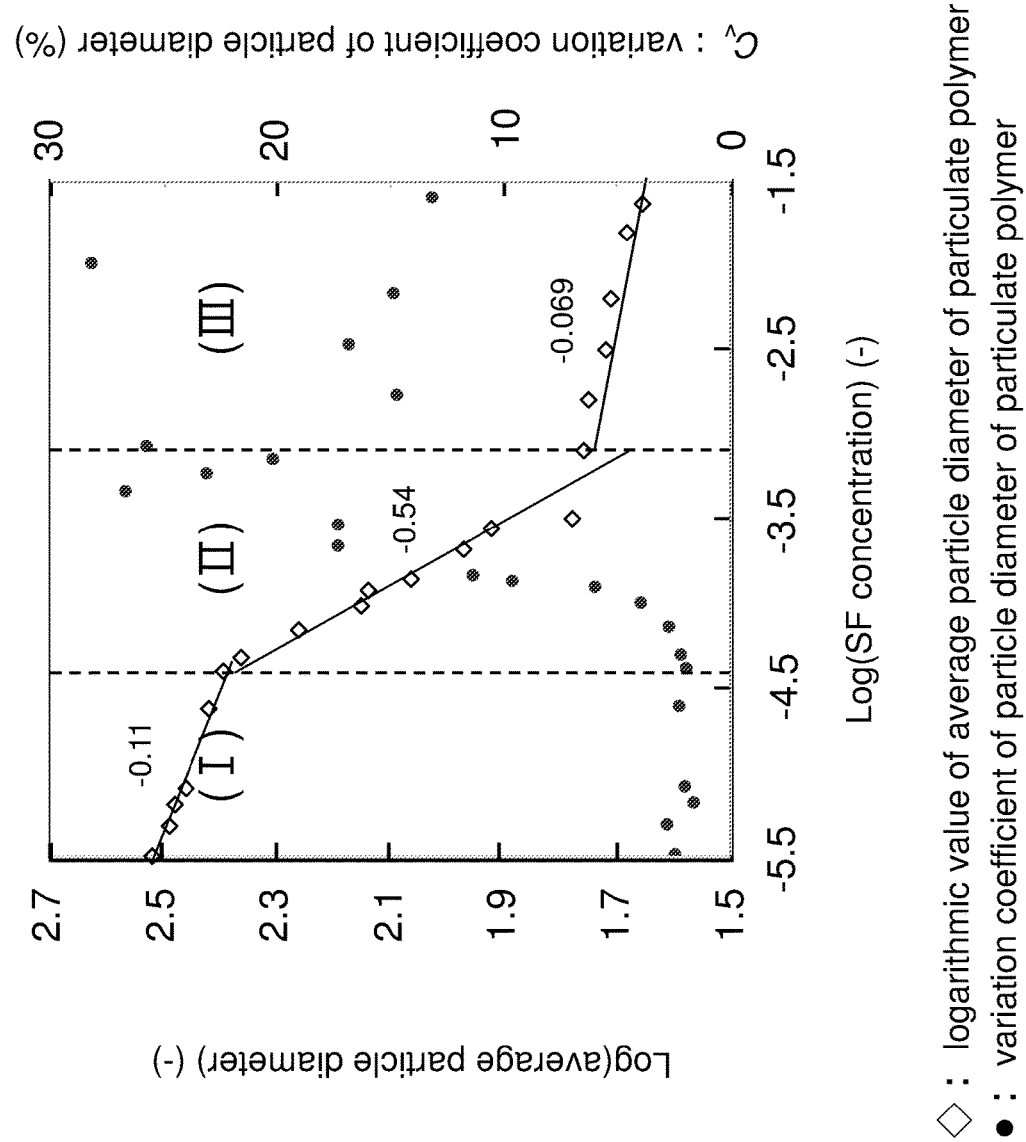
FIG. 2 is a graph of the relationship between a logarithmic value of an average particle diameter of a particulate polymer produced according to one or more embodiments of the present invention and a logarithmic value of a concentration of sodium surfactin, and a graph of the relationship between a variation coefficient of a particle diameter of the particulate polymer and a logarithmic value of the concentration of sodium surfactin.

The polymerization rate of the obtained particulate polymer was measured by a dry weight method. In addition, the obtained particulate polymer was observed using a transmission electron microscope (TEM), and the photographed image was analyzed using an image analysis measurement software ("WinROOF (registered mark)" manufactured by MITANI Corporation) to obtain the average particle diameter and the variation coefficient ($C_v$) thereof. Each photographed image is shown as FIG. 1(a)-(d), the graph to demonstrate the relationship between a logarithmic value of the average particle diameter and a logarithmic value of the concentration of sodium surfactin is shown as FIG. 2, and the graph to demonstrate the relationship between a logarithmic value of the particle number calculated from the average particle diameter and a logarithmic value of a concentration of sodium surfactin is shown as FIG. 3.

In accordance with Smith-Ewart theory, the number of a particulate polymer produced by emulsion polymerization is proportionate to three-fifths power of a concentration of a surfactant. On the one hand, the case that a surfactin salt is used as a surfactant is not amenable to Smith-Ewart theory, as the inclination is not ⅗, i.e. 0.6, in any regions of FIG. 3.

Figure 3:
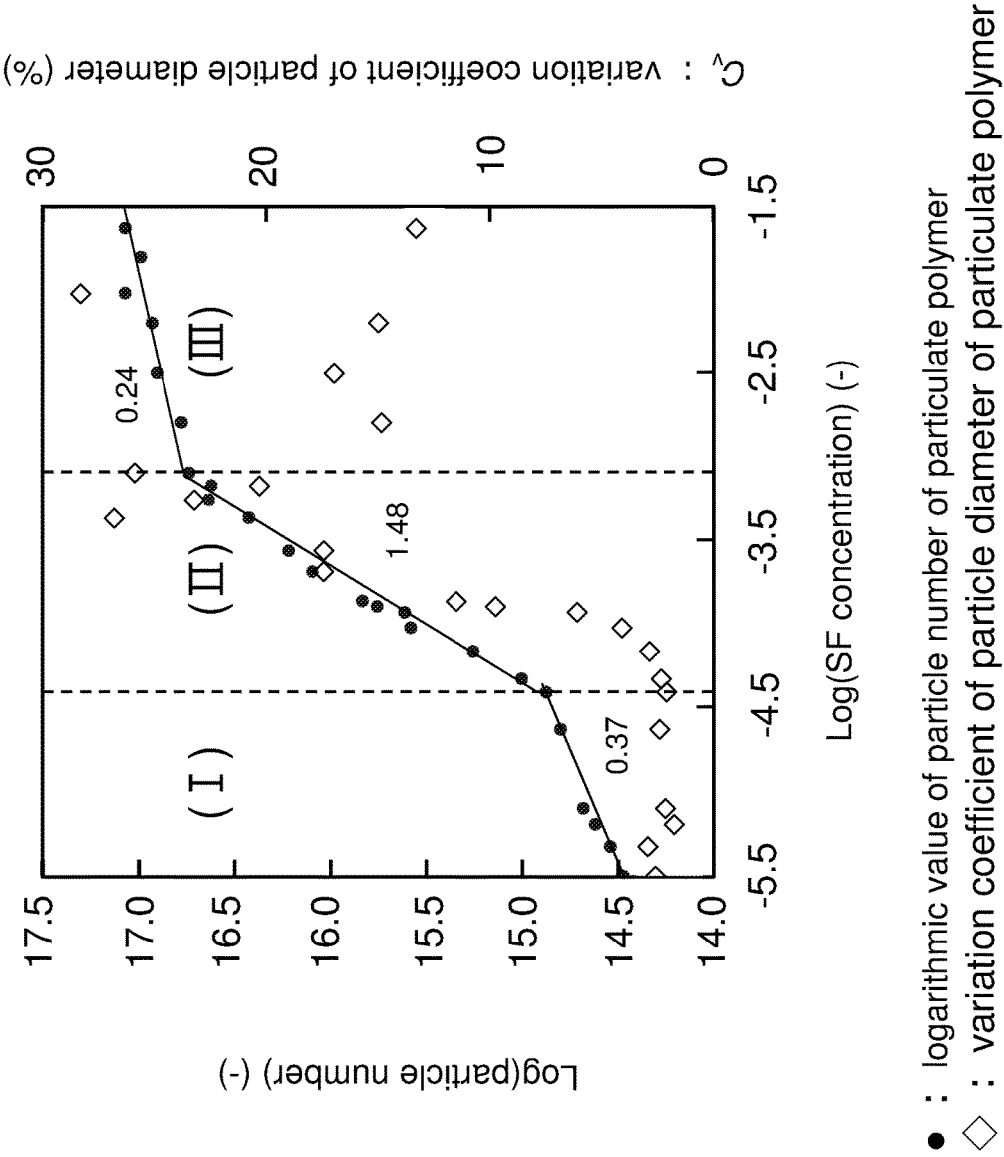
FIG. 3 is a graph of the relationship between a logarithmic value of a particle number of a particulate polymer produced according to one or more embodiments of the present invention and a logarithmic value of a concentration of sodium surfactin, and a graph of the relationship between a variation coefficient of a particle diameter of the particulate polymer and a logarithmic value of the concentration of sodium surfactin.

In addition, it is contemplated that the polymerization reaction proceeded similarly to emulsion polymerization without an emulsifier regardless of the existence of sodium surfactin in critical concentration or more in the region (I) of the graph of FIG. 3, since the particle diameter was relatively large, the value of $C_v$ was very small and the uniformity of the particle diameter was very high. In addition, it is suggested that the reaction was changed from a reaction similar to emulsion polymerization without an emulsifier to emulsion polymerization in the region (II), since the value of $C_v$ was considerably changed in the region. Furthermore, it is presumed that the polymerization reaction proceeded by the mechanism of emulsion polymerization in region (III), since the particle diameter was small and the value of $C_v$ was large in the region. On the one hand, it is contemplated that the polymerization reaction did not proceed by the mechanism of general emulsion polymerization, since the inclination of the graph was not 0.6 as the theoretical value. From the above-described experimental result, it is suggested that the polymerization reaction according to one or more embodiments of the present invention proceeds by a unique mechanism.

In addition, the relationship between a logarithmic value of the average particle diameter of the particulate polymer obtained by the polymerization reaction and a logarithmic value of the concentration of surfactin is linear in each region of FIG. 3. Thus, it was experimentally demonstrated from the result that an average particle diameter of the produced particulate polymer can be adjusted by adjusting the concentration of surfactin.

Although the disclosure has been described with respect to only a limited number of embodiments, those skilled in the art, having benefit of this disclosure, will appreciate that various other embodiments may be devised without departing from the scope of the present invention. Accordingly, the scope of the present invention should be limited only by the attached claims.

What is claimed is:

1. A method for producing a particulate polymer, the method comprising:
    polymerizing a monomer having a vinyl group in an aqueous solvent in the presence of a polymerization initiator and a surfactin salt represented by:

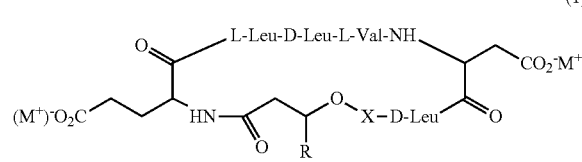

(1)

wherein X is an amino acid residue selected from the group consisting of leucine, isoleucine and valine; R is a $C_{9-18}$ alkyl group; and $M^+$ is an alkali metal ion or a quaternary ammonium ion,
    wherein a concentration of the surfactin salt in a polymerization reaction liquid is adjusted in accordance with the following formulae depending on a target particle diameter of the particulate polymer:

$\log(y^1 k) = -0.11 \log(x^1) + 1.91$ $\log(y^2 k) = -0.54 \log(x^2) - 0.0096$ $\log(y^3 k) = -0.069 \log(x^3) + 1.55$ wherein $y^1$, $y^2$, and $y^3$ are the target particle diameters of the particulate polymer in a unit of nm; $x^1$, $x^2$, and $x^3$ are the concentrations of the surfactin salt in the polymerization reaction liquid in a unit of mM; and k is a constant of 0.5 to 2, and
wherein $y^1$ is 250 nm to 400 nm, $y^2$ is 55 nm to less than 250 nm, and $y^3$ is 30 nm to less than 55 nm.

2. The method according to claim 1, wherein the concentration of the surfactin salt in the polymerization reaction liquid is adjusted to 0.0005 mass % or less.

3. The method according to claim 1, wherein a ratio of the surfactin salt to 100 parts by mass of the monomer is adjusted to 20 parts by mass or less.

4. The method according to claim 1, further comprising:
    separating the produced particulate polymer from a liquid phase;
    adding a multivalent metal ion to the liquid phase to coagulate the surfactin salt; and
    separating the coagulated surfactin salt.

5. The method according to claim 4, further comprising adding an alkali metal ion to the polymerization reaction liquid after the polymerizing and before the separating the produced particulate polymer to coagulate the particulate polymer.

6. The method according to claim 2, further comprising:
    separating the produced particulate polymer from a liquid phase;
    adding a multivalent metal ion to the liquid phase to coagulate the surfactin salt; and
    separating the coagulated surfactin salt.

7. The method according to claim 3, further comprising:
    separating the produced particulate polymer from a liquid phase;
    adding a multivalent metal ion to the liquid phase to coagulate the surfactin salt; and
    separating the coagulated surfactin salt.

8. The method according to claim 6, further comprising adding an alkali metal ion to the polymerization reaction liquid after the polymerizing and before the separating the produced particulate polymer to coagulate the particulate polymer.

9. The method according to claim 7, further comprising adding an alkali metal ion to the polymerization reaction liquid after the polymerizing and before the separating the produced particulate polymer to coagulate the particulate polymer.

* * * * *